(12) United States Patent
Desbiolles et al.

(10) Patent No.: US 10,241,522 B2
(45) Date of Patent: Mar. 26, 2019

(54) COMMUNICATION METHOD IN A SYSTEM COMPRISING A POWER SUPPLY AND COMMUNICATION ENTITY AND A HOME AUTOMATION ACTUATOR

(71) Applicant: Somfy SAS, Cluses (FR)

(72) Inventors: Claude Desbiolles, Eteaux (FR);
Florian Germain, Meythet (FR);
Daniel Mugnier, Passy (FR); Stephane Riffaud, Sallanches (FR)

(73) Assignee: Somfy SAS, Cluses (FR)

( * ) Notice: Subject to any disclaimer, the term of this patent is extended or adjusted under 35 U.S.C. 154(b) by 1174 days.

(21) Appl. No.: 14/022,981

(22) Filed: Sep. 10, 2013

(65) Prior Publication Data

US 2014/0012421 A1  Jan. 9, 2014

Related U.S. Application Data

(63) Continuation-in-part of application No. 13/911,768, filed on Jun. 6, 2013, which is a continuation-in-part of application No. PCT/EP2012/074704, filed on Dec. 6, 2012.

(30) Foreign Application Priority Data

Dec. 6, 2011 (FR) ...................................... 11 61198

(51) Int. Cl.
*G05D 15/00* (2006.01)
*G08C 17/02* (2006.01)
*H04L 12/28* (2006.01)

(52) U.S. Cl.
CPC ............. *G05D 15/00* (2013.01); *G08C 17/02* (2013.01); *H04L 12/282* (2013.01);
(Continued)

(58) Field of Classification Search
CPC ...... G05D 15/00; G08C 17/02; H04L 12/282; H04L 12/2807
See application file for complete search history.

(56) References Cited

U.S. PATENT DOCUMENTS

8,000,656 B1    8/2011   Jiao et al.
8,843,416 B2 *  9/2014   Scelzi .................... G01K 17/20
                                                    700/286

(Continued)

OTHER PUBLICATIONS

International Search Report and Written Opinion issued by European Patent Office acting as the International Search Authority for priority application PCT/EP2012/074704 dated Jan. 8, 2013.

*Primary Examiner* — Charles E Anya
(74) *Attorney, Agent, or Firm* — Huang Partners LLP (57) ABSTRACT

A communication method for a home automation actuator comprising an electric motor driving a moving element in a building and two electric terminals making it possible to power the actuator by a power supply and communication entity (IMS) and allowing communication between the actuator and the power supply and communication entity (IMS), the method comprising the following steps:
 analysis of a power supply signal supplied by the power supply and communication entity;
 generation of a first time-sequence of a response signal, representative of a first predetermined calibration information element, called first calibration sequence;
 sending of a series of time-sequences of the response signal, representative of a series of information elements, each information element of this series, equal to the calibration information element, being represented by a time-sequence which is an image of the first calibration sequence.

35 Claims, 7 Drawing Sheets

(52) U.S. Cl.
CPC .................. *H04L 12/2807* (2013.01); *G05B 2219/36464* (2013.01); *G05B 2219/45015* (2013.01)

(56) References Cited

U.S. PATENT DOCUMENTS

| | | | | |
|---|---|---|---|---|
| 9,495,009 | B2* | 11/2016 | Levin | G06F 3/016 |
| 2005/0047922 | A1* | 3/2005 | Brown | F23L 17/005 |
| | | | | 417/22 |
| 2006/0193293 | A1* | 8/2006 | Duval | G08C 17/02 |
| | | | | 370/331 |
| 2008/0013226 | A1* | 1/2008 | Kirst | H02H 9/008 |
| | | | | 361/18 |
| 2008/0058966 | A1* | 3/2008 | Wacker | H02P 23/0077 |
| | | | | 700/57 |
| 2009/0195295 | A1* | 8/2009 | Uematsu | G06F 1/26 |
| | | | | 327/530 |
| 2010/0164400 | A1* | 7/2010 | Adragna | H02M 1/4225 |
| | | | | 315/294 |
| 2011/0026580 | A1* | 2/2011 | Deurenberg | H03K 7/08 |
| | | | | 375/238 |
| 2011/0316446 | A1* | 12/2011 | Kang | H02M 3/33507 |
| | | | | 315/297 |
| 2012/0020419 | A1* | 1/2012 | Kaeriyama | H04L 25/4902 |
| | | | | 375/259 |
| 2013/0049644 | A1* | 2/2013 | Neumann | F24F 13/1426 |
| | | | | 318/15 |
| 2013/0116834 | A1* | 5/2013 | Grabinger | F24F 13/1426 |
| | | | | 700/276 |

* cited by examiner

COMMUNICATION METHOD IN A SYSTEM COMPRISING A POWER SUPPLY AND COMMUNICATION ENTITY AND A HOME AUTOMATION ACTUATOR

This application is a continuation-in-part of U.S. patent application Ser. No. 13/911,768 filed Jun. 6, 2013 which is a continuation-in-part of International Application PCT/EP2012/074704 filed Dec. 6, 2012 which claims priority to French Patent Application No. 1161198 filed Dec. 6, 2011, the disclosures of which are all incorporated herein by reference.

FIELD OF THE INVENTION

The invention relates to the field of home automation installations comprising electric actuators for driving a moving element in a building, such as closures or solar protection means.

These actuators, in normal operation on the site, are controlled via a wireless interface and/or a wired interface.

Throughout the development, production, assembly of the supporting product in the factory, identification and diagnostic testing of an actuator on site, it is necessary to dialog with the actuator, to transmit and/or receive information such as date of assembly, torque, speed, serial number, etc.

This dialog is performed using a power supply and communication entity that is capable of powering the actuator and of communicating therewith.

The communication must be performed in such a way as to cover the whole range and with a minimum cost overhead and a bit rate that is as high as possible.

PRIOR ART

Solutions for implementing communication between an actuator and a power supply and communication entity are known, for example using a wired interface of UART or USB type. Dedicated interfaces and components have to be used for the connection, which induces an increase in the cost and complexity of the products. Furthermore, for the programming of these interfaces, the bit rate and the data format have to be known in advance by the actuator and the power supply and communication entity.

A communication will be implementable only between a sender and a receiver sharing the same bit rates and data formats. Because of this, a power supply and communication entity will be able to communicate only with a subset of the range of actuators.

The parameters of a communication may also vary with operating conditions. For example, a significant temperature variation may result in a variation of the signals exchanged.

The invention sets out to resolve these problems, and enable a power supply and communication entity to communicate with different actuators, or with a same actuator ACT, in variable conditions.

SUMMARY OF THE INVENTION

According to a first aspect of the invention, a communication method for an actuator is defined by claim 1.

Various embodiments of the communication method for an actuator are defined by the dependent claims 2 to 13.

According to a first aspect of the invention, a communication method for a power supply and communication entity is defined by claim 14.

Various embodiments of the communication method for a power supply and communication entity are defined by the dependent claims 15 to 24.

According to a first aspect of the invention, an actuator is defined by claim 25.

According to a first aspect of the invention, a power supply and communication entity is defined by claim 26.

The invention also relates to a storage medium that can be read by a processor on which is stored a computer program comprising instructions for executing the steps of the communication method for an actuator defined previously.

The invention also relates to a storage medium that can be read by a processor on which is stored a computer program comprising instructions for executing the steps of the communication method for a power supply and communication entity defined previously.

DETAILED DESCRIPTION OF A PREFERRED EMBODIMENT

Figure 1:
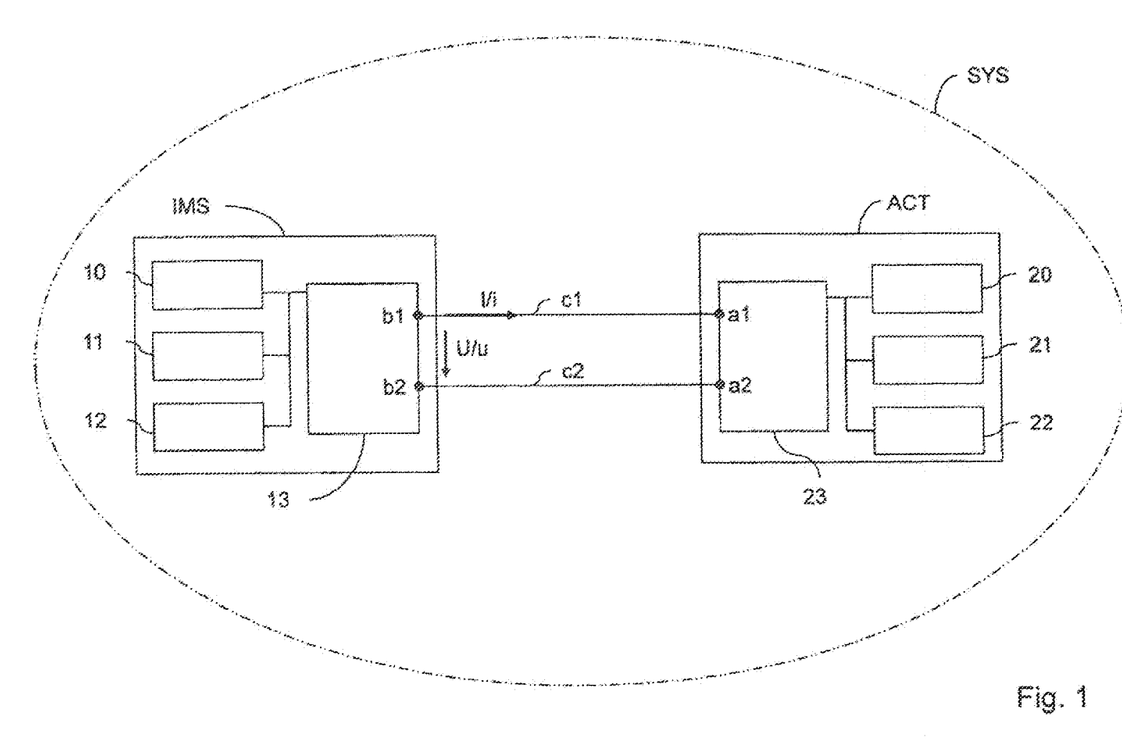
FIG. 1 represents a system SYS implementing the invention.

FIG. 1 shows a home automation system comprising a power supply and communication entity IMS comprising a processor 10, a random access memory of RAM type 11, a non-volatile program memory, possibly rewritable, of ROM or flash type 12 and a line interface 13 making it possible to power an actuator ACT and allowing communication therewith via two electric terminals b1, b2.

FIG. 1 also shows the actuator ACT comprising a processor 20, a random access memory of RAM type 21, a non-volatile program memory, possibly rewritable, of ROM or flash type 22 and a line interface 23 for receiving the power supply voltage and communicating with the power supply and communication entity IMS via two electric terminals a1, a2. The actuator is preferentially a home automation actuator. It comprises an electric motor driving a moving element of a building, such as a moving closure, blind, solar protection or screen element.

The line interfaces 13 and 23 are connected by two wires c1, c2 capable of connecting the actuator ACT to an electric power supply generated by the power supply and communication entity IMS and of forming a physical communication medium between the actuator ACT and the power supply and communication entity IMS.

The power supply and communication entity IMS supplies the actuator ACT with an electrical power supply signal, in the form of a voltage signal U or electric current i.

This signal is generated by the power supply and communication entity IMS between its electric terminals b1, b2.

The wires c1, c2 produce an electrical connection between the electric terminals b1, b2 of the power supply and communication entity IMS and the electric terminals a1, a2 of the actuator ACT, thus allowing for the electrical power supply thereof.

Hereinafter in this document, the electrical power supply signal, supplied by the power supply and communication entity IMS to the actuator ACT, is called "power supply signal".

The actuator ACT constitutes, as seen from its terminals a1, a2, a load impedance for the power supply and communication entity IMS.

Following the connection of the wires c1, c2, between the electric terminals a1, a2, of the actuator ACT and b1, b2, of the power supply and communication entity IMS, an electrical signal is established in response: if the electrical power supply is supplied in the form of a voltage signal U, this signal is the intensity of the electrical current I.

Alternatively, the power supply may be supplied in the form of an electrical current signal i; in this case, the signal established in response is an electrical voltage u.

Hereinafter in this document, the signal which is established following the generation of the power supply signal U, i, and the connection of the wires c1, c2, between the electric terminals a1, a2, of the actuator ACT and b1, b2, of the power supply and communication entity IMS, is called "response signal".

Thus, these power supply and response signals are therefore present on the wires c1, c2 and at the terminals a1, a2 and b1, b2.

The response signal which is established depends on the one hand on the power supply signal supplied by the power supply and communication entity IMS and on the other hand on the impedance of the actuator ACT. This is because, the latter, by provoking a variation of its impedance Zact, creates variation of the response signal and thus transmits an information item to the power supply and communication entity IMS.

The communication between the actuator ACT and the power supply and communication entity IMS is then carried out by the sending of data by the actuator ACT, in the form of a data frame forming at least part of the response signal. The data frame preferentially corresponds to a series of information elements, represented by variations of the response signal circulating on the wires c1, c2.

The power supply and communication entity IMS comprises means for detecting current and voltage respectively. By using techniques known to a person skilled in the art, such as sampling and storage, the power supply and communication entity IMS can determine the variations in time of the response signal. A set of the variations in time of the response signal during a time period is hereinafter in this document called "time-sequence of the response signal". The duration of the time period is determined according to a criterion shared by the actuator ACT and the power supply and communication entity IMS. Such a criterion can be a predetermined duration or the passage of the response signal, during its variations, through predefined threshold values, and possibly through extreme values between these predefined threshold values. The two criteria can be combined to delimit one and the same sequence, as will be explained hereinbelow.

A time-sequence of the response signal can be represented by a first time graph. Any set of time variations of the response signal that can be represented by a second time graph that is identical or substantially identical to the first time graph is called "image" of a time-sequence.

The communication methods according to the invention are, for example, implemented in a system SYS represented in FIG. 1.

This system SYS comprises a power supply and communication entity IMS, comprising two electric terminals b1, b2, and at least one home automation actuator ACT comprising an electric motor for driving a moving element in a building and two electric terminals a1, a2. A connection by wires c1, c2, between the electric terminals of the power supply and communication entity IMS, b1, b2, and those of the actuator, a1, a2, make it possible to power the actuator ACT by the power supply and communication entity IMS and allow communication between the actuator ACT and the power supply and communication entity IMS.

Figure 6:
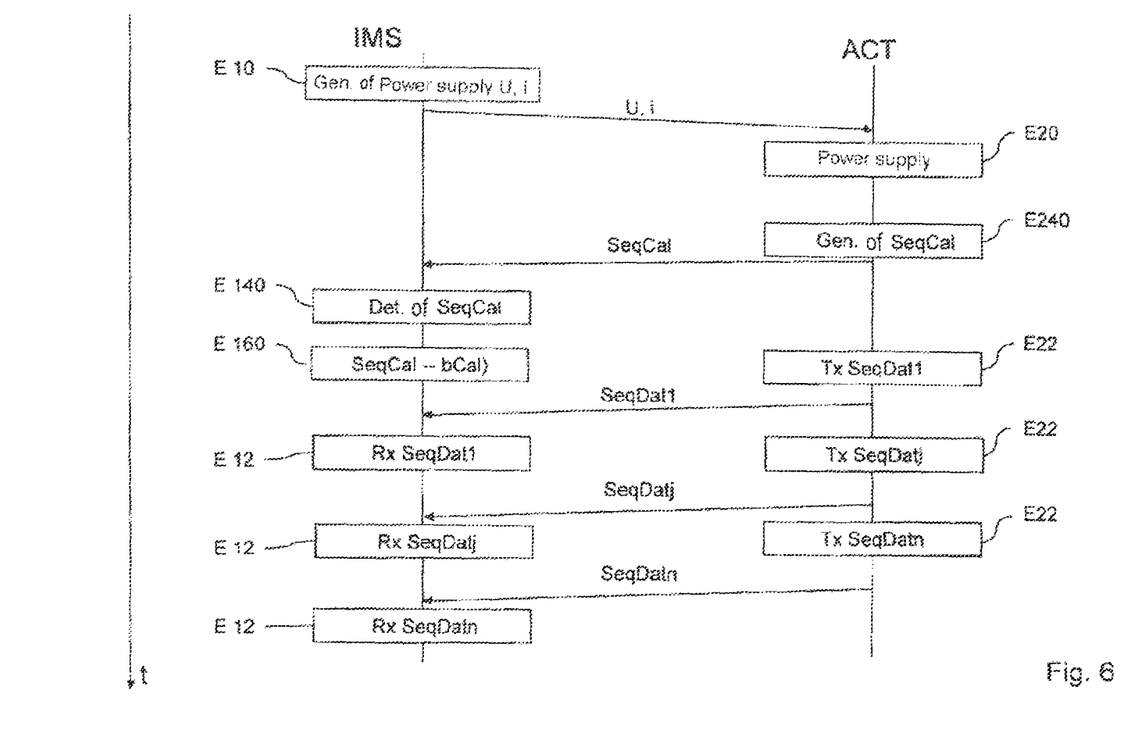
FIG. 6 represents the main exchanges between a power supply and communication entity IMS and an actuator ACT, in a system SYS according to the invention.

With reference to FIG. 6, the main steps of a mode of execution of a communication method according to the invention will now be described. Generally, this communication method for the system SYS comprises the following steps:

a step E10, implemented by the power supply and communication entity IMS, of generation of a power supply signal in voltage U, respectively in current i, between the electric terminals b1, b2;

a step E20, implemented by the actuator ACT, of analysis of the power supply signal U, respectively i;

a step E240, implemented by the actuator ACT, of generation of a first time-sequence of a response signal in current I, respectively in voltage u, representative of a first predetermined calibration information element bCal, called first calibration sequence SeqCal;

a step E140, implemented by the power supply and communication entity IMS, of determining the first calibration sequence SeqCal;

a step E160, implemented by the power supply and communication entity IMS, of assignment of a meaning of representation of the predetermined calibration information element bCal, to the first calibration sequence SeqCal;

a step E22, implemented by the actuator ACT, of sending of a series of time-sequences of the response signal I, respectively u, representative of a series of information elements, each information element of this series, equal to the calibration information element bCal, being represented by a time-sequence which is an image of the first calibration sequence SeqCal;

a step E12, implemented by the power supply and communication entity IMS, of reception of the series of time-sequences of the response signal I, respectively u, representative of the series of information elements.

An embodiment of the communication method implemented by an actuator ACT is described with reference to FIGS. 4, 4a, 4b and 5. In this embodiment, the information elements are binary and will be referred to simply as "binary elements".

Figure 4:
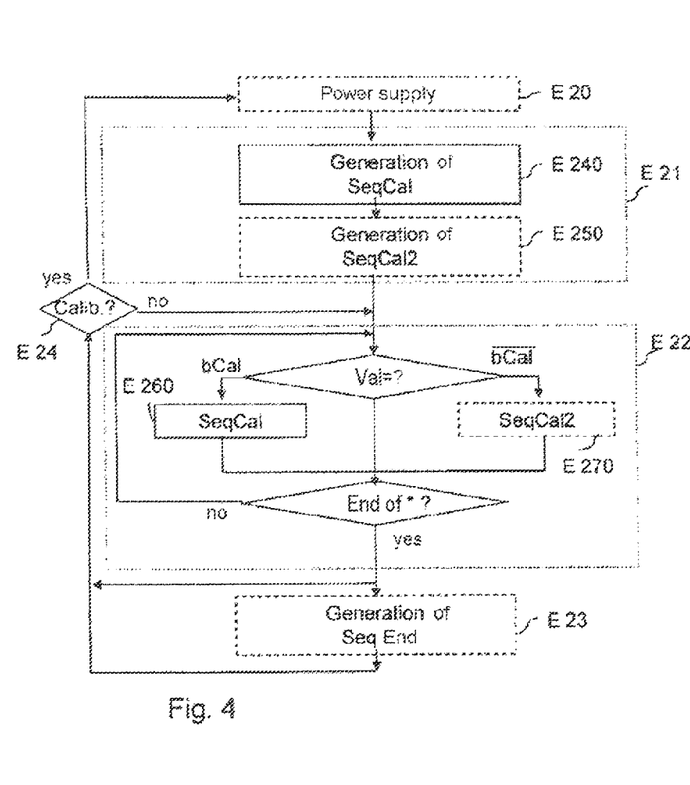
FIGS. 4, 4a and 4b represent, in flow diagram form, the main steps of a communication method according to the invention, implemented by an actuator ACT.

The actuator ACT determines, during a step E20, whether a power supply signal voltage U, respectively in current i, is supplied at its terminals a1, a2.

Then, the actuator ACT generates, during a step E240, a first time-sequence of the response signal, representative of a predetermined calibration binary element bCal, called first calibration sequence SeqCal.

The second binary element, complementary to the calibration binary element bCal, can be represented by a second calibration sequence SeqCal2.

This second calibration sequence SeqCal2 can be generated by the actuator ACT, during a step E250. Alternatively, the second calibration sequence SeqCal2 can be deduced from the first calibration sequence SeqCal, for example by the addition or removal of a predetermined part of the image of the first calibration sequence SeqCal.

It should be noted that only the first calibration sequence SeqCal needs to be known, the complementary binary element being able to be made up by any sequence, not necessarily always the same, different from the first calibration sequence SeqCal. The calibration sequence of the complementary binary element can also be deduced from the first calibration sequence.

The step E240 of generation of the first calibration sequence SeqCal, possibly followed by the optional step E250 of generation or deduction of the second calibration sequence SeqCal2, constitutes/constitute a calibration step E21.

The role of this step E21 is to transmit to the power supply and communication entity IMS the information concerning the encoding of the data which will be transmitted subsequently. In this way, the encoding can change on each new connection and/or on each modification of transmission conditions.

The calibration step E21 is followed by a step E22 of sending of a data frame, in the form of a series of time-sequences of the response signal I, respectively u, representative of a series of binary elements forming the data frame to be sent.

The actuator ACT generates, for each data binary element equal to the calibration binary element bCal, a time-sequence of the response signal, that is an image of the first calibration sequence SeqCal.

A data binary element complementary to the calibration bit bCal can be represented by a time-sequence of the response signal that is an image of the second calibration sequence SeqCal2.

The actuator ACT can have a data frame to be sent, for example:
- following a reception of a frame previously sent by the power supply and communication entity IMS, if this frame asks for an acknowledgement or application information from the actuator ACT;
- following a self-test (a test of itself) performed by the actuator ACT after it is powered up, in order to transmit to the power supply and communication entity IMS the result of the self-test and information such as the hardware and software version, batch number, operating parameters;
- following an event detected by the actuator, with no prior request from the power supply and communication entity IMS.

In one embodiment, the actuator ACT and the power supply and communication entity IMS use dedicated wires for the electrical power supply, and dedicated wires c1, c2 for the communication. In this case, the voltage, respectively current, generator used for the communication can supply signals U, respectively i, only for the power supply for the communication interface. This interface comprises the terminals b1, b2 of the power supply and communication entity IMS, the terminals a1, a2 of the actuator ACT and the wires c1, c2.

Alternatively, the actuator ACT and the power supply and communication entity IMS use the same wires c1, c2, to implement different, mutually exclusive operating modes, such as a command execution mode and a downlink and/or uplink communication mode. The same wires c1, c2 are used to power the actuator ACT, regardless of the operating mode.

Figure 2A:
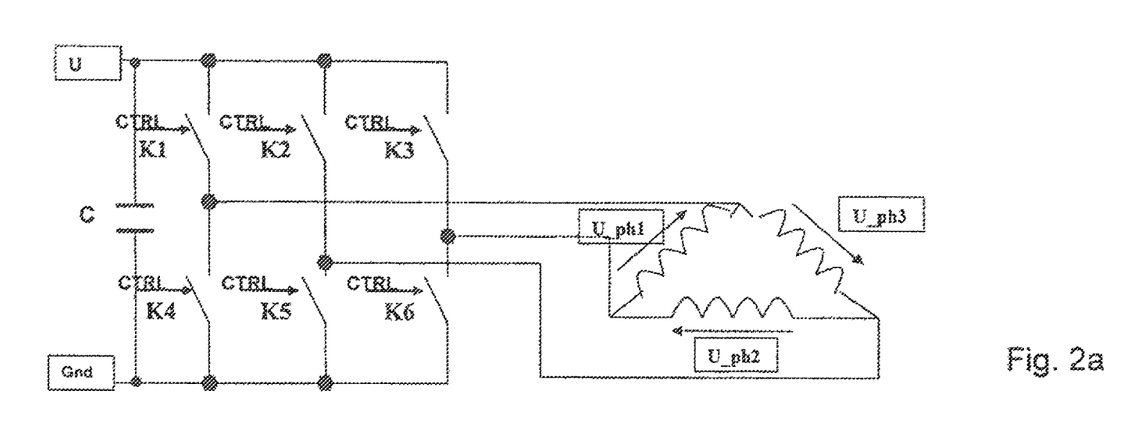
FIGS. 2a and 2b represent, in simplified form, two embodiments of a motor forming part of an actuator according to the invention.
Figure 2B:
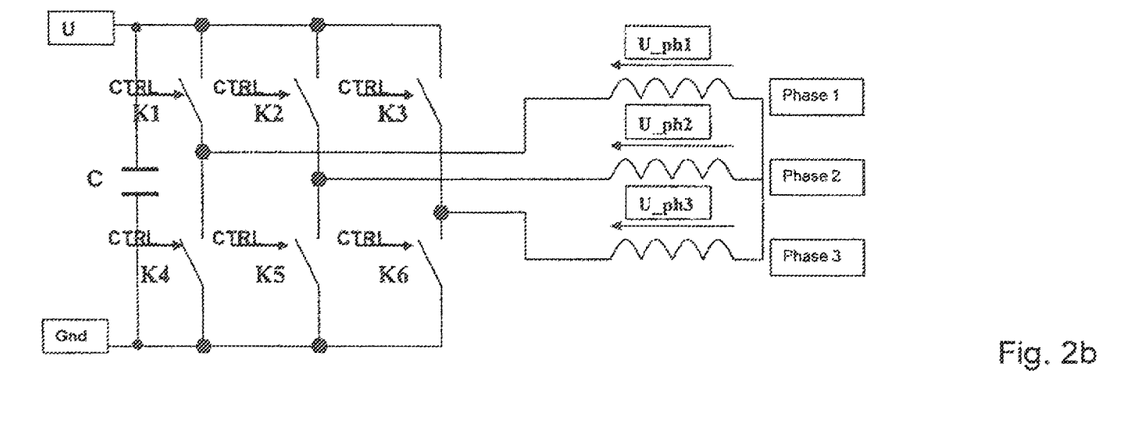

During the command execution mode, the operation of the motor is controlled by electronic components as illustrated schematically by FIGS. 2a and 2b.

During the uplink communication mode, the actuator ACT uses the electronic components, used in command execution mode to control the motor, differently, that is to say to configure the actuator as load impedance having particular values.

By varying the configuration of the electronic components, the actuator ACT can vary the load impedance Zact presented to the power supply and communication entity IMS; in this way, the actuator ACT can generate variations of the response signal in current, respectively in voltage, at its terminals a1, a2 and on the wires c1, c2.

Whatever the configuration, wires c1, c2, dedicated to communication or same wires c1, c2, used for the power supply and communication, the actuator implements the sending of a frame over these wires c1, c2, by varying its input impedance.

In this way, for a power supply signal in voltage U, the actuator ACT will provoke a variation of the response signal in current I, and for a power supply signal in current i, a variation of the response signal in voltage u.

The invention can be implemented by an actuator ACT using motors known to a person skilled in the art as "brushless" motors, schematically represented in FIGS. 2a and 2b.

The control of these motors in normal operation is handled by the electronic switches K1, K2, K3, K4, K5 and K6, implemented, for example, by using MOS transistors or insulated gate bipolar transistors, under the control of a module CTRL which is not represented.

In uplink communication mode, the control module CTRL can configure the switches K1, K2, K3, K4, K5 and K6 differently; in this case, the load impedance presented by the motor of the actuator ACT varies according to the configuration of the electronic switches.

Figure 5:
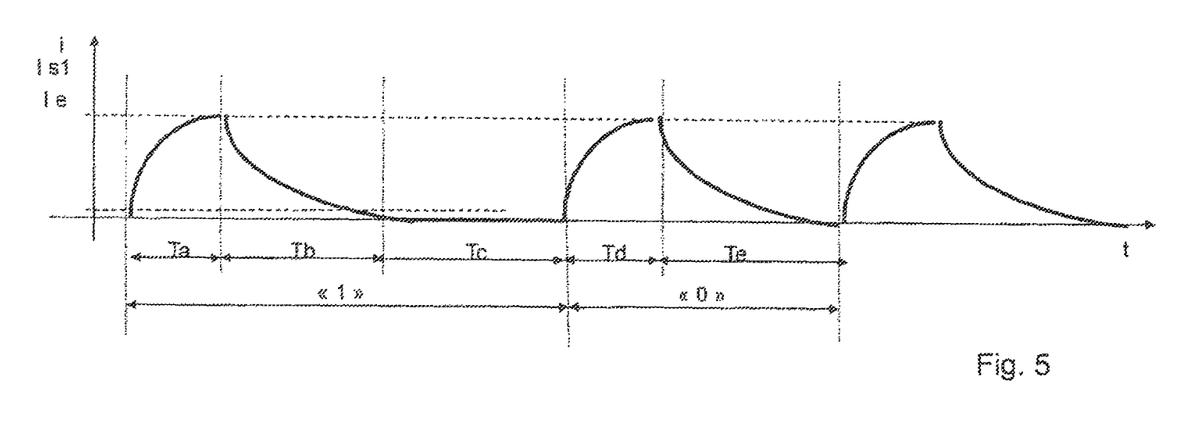
FIG. 5 represents a series of time-sequences of the response signal used for the uplink communication.

In the example illustrated by FIG. 5, the actuator ACT is powered by voltage. To represent a given binary element, the actuator ACT generates a time-sequence of the response signal in current I, respectively in voltage u, by varying the configuration of the switches Ki according to a sequence that is specific to each binary element; the result of this is a current time-sequence specific to each binary element.

The invention can be implemented by an actuator ACT using other known types of motors, such as an asynchronous, synchronous, universal (DC), stepper or piezoelectric motor.

The values of the impedances can vary from one product to another or, for one and the same product, with the operating conditions. For the same power supply signal voltage U, respectively in current i, the time-sequences of the response signal in current, respectively in voltage, can therefore be different.

Figure 4A:
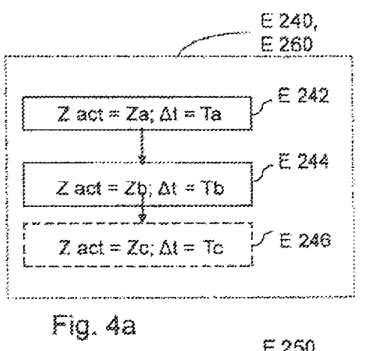
Figure 4B:
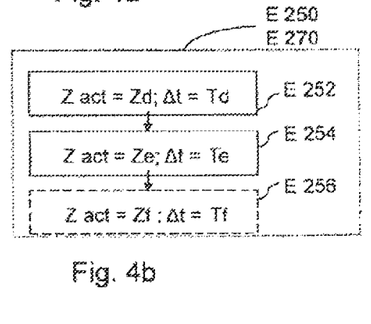

In the example illustrated by FIGS. 4, 4a et 4b and 5, the step E240 of generation of the first calibration sequence SeqCal, representative of the predefined calibration binary element bCal, with a value of, for example, "1" comprises a substep E242 of maintaining a first configuration of the switches, ensuring an impedance Za for a first duration Ta. This configuration allows for the variation of the response signal in current I, respectively in voltage u, up to an extreme value, minimum or maximum, $I_e$, $u_e$.

Then, a substep E244 of maintaining a second configuration of the switches, ensuring an impedance Zb for a second duration Tb, is executed. In the case of a power supply in voltage U, this second configuration makes it possible to recharge capacitive elements C of the actuator ACT, resulting in a decrease in the response signal in current I.

A third substep E246 of maintaining a third configuration of the switches ensures an impedance Zc for a third duration Tc. In the case of a power supply in voltage, this configuration can correspond to maintaining a response signal in current I that is virtually zero on the wires c1, c2.

Similarly, the complementary binary element, with a value, for example, of "0", can be represented by a sequence of two configurations of the switches respectively ensuring the impedances Zd, Ze for durations Td, Te.

The values Zd, Td can be equal to Za, Ta, and the values Ze, Te can be equal to Zb, Tb. The time-sequence constituting the bit of value "0" can differ from the time-sequence constituting the bit of value "1" only in that it does not comprise any substep of maintaining a configuration of the switches, ensuring the impedance Zc for the duration Tc. In particular, the latter configuration may not exist, in other words Tc=0. Such an embodiment is illustrated by FIG. 5.

Other embodiments can be implemented
  by adding to the sequences representative of the two binary elements durations Ti, Tj of the impedance Zi, respectively Zj, configurations; or
  by removing sequences, for example the optional substep E246 for the steps E240, E260.

The values of the times, Ta, Tb, Tc, Td, Te, Ti and Tj can be predetermined. Alternatively, the corresponding configurations ensuring the impedances Za, . . . , Zj are maintained as long as the response signal current I, respectively in voltage u, on the wires c1, c2 has not reached predetermined values $I_a$, . . . , $I_j$, respectively $u_a$, . . . , $u_j$.

The two methods can be used for one and the same sequence: the durations Ta and Tb can be determined as a function of the response signal in current I, respectively in voltage u; the duration Tc can be predetermined.

For example, the duration Ta is the duration of variation of the response signal between a predefined first threshold value Is1, respectively us1, and an extreme value $I_e$, respectively $u_e$; Tb is the duration of variation of the response signal between the extreme value $I_e$, respectively $u_e$, and a predefined second threshold value Is2, us2.

In the embodiment represented, the actuator ACT sends, during a step E22, the binary elements constituting the data frame, by generating, according to the value of the binary element to be sent:
  the first calibration sequence SeqCal, if the binary element to be sent is equal to the calibration bit bCal, during a step E260; or
  the second calibration sequence SeqCal2, if the binary element to be sent is complementary to the calibration bit bCal, during a step E270.

In one embodiment, the actuator can send, during a step E23, after the sending of the data, a fourth time-sequence of the response signal indicating the end of the frame.

As already mentioned, a calibration step E21 is executed by the actuator ACT to transmit to the power supply and communication entity IMS the information concerning the encoding of the information which will be transmitted subsequently.

This step can be executed several times during one and the same connection (or one and the same operating mode) if the transmission conditions change. Such a change, requiring a new calibration, can be detected by each element of the system SYS and signaled to the remote element, as explained hereinbelow in this document.

The method implemented by the actuator ACT comprises a decision step E24 to decide whether a new calibration step E21 needs to be executed. From the point of view of the actuator ACT, two situations can occur: the actuator ACT itself detects a significant change in the operating conditions, requiring a new calibration, or the power supply and communication entity IMS sends a calibration request, and the actuator detects this request.

In the first case, a new calibration can be signaled by the actuator ACT to the power supply and communication entity IMS during the step E24, by the generation of a predetermined third time-sequence of the response signal in current IReqCal2, respectively in voltage uReqCal.

A new sending of the calibration sequence SeqCal can be initiated by the actuator ACT if the number of transmission errors detected is too great. This error detection can be performed using known techniques, such as the repetition of a frame by the actuator if this frame is not acknowledged by the power supply and communication entity within a predetermined time.

In the second case, the actuator ACT may detect, during the step E24, a predetermined time variation of the power supply signal, uReqCal, respectively of the current iReqCal, generated by the power supply and, communication entity IMS. Following this detection, the actuator ACT can once again generate the first calibration sequence SeqCal, followed in some embodiments by the generation of the second calibration sequence SeqCal2.

A mode of execution of the method implemented by the power supply and communication entity IMS is now described with reference to FIGS. 3, 3a and 3b.

The power supply and communication entity IMS determines the first calibration sequence SeqCal, during a step E140, that is to say that the power supply and communication entity determines or identifies electrical characteristics of the response signal, in particular electrical characteristics for a duration that is either predetermined or determined as a function of the response signal, as explained above.

A meaning of representation of a first predetermined calibration binary element bCal is assigned to the first calibration sequence (SeqCal) during a step E160; that is to say that the power supply and communication entity assigns a meaning to the first calibration sequence, in particular, it can assign the value "1" or the value "0" to the first calibration sequence SeqCal.

Then, during a step E12, the power supply and communication entity IMS receives at least one data frame made up of a series of binary elements. Each binary element is represented by a time-sequence of the response signal in current I, respectively in voltage u, called data sequence SeqDat. These data sequences, detected between the terminals b1, b2, are representative either of the calibration binary element bCal, or of the complementary binary element, Each data binary element equal to the calibration binary element bCal is represented by a time-sequence of the response signal that is an image of the first calibration sequence SeqCal.

The power supply and communication entity IMS, having means for determining the time-sequences of the response signal I, u, on the wires c1, c2, can deduce the binary elements transmitted.

The power supply and communication entity IMS comprises means for sampling and storing the response signal in current I, respectively in voltage u, detected between its terminals b1, b2. The power supply and communication entity IMS can thus determine the image of the time-sequence of the response signal I, u.

The power supply and communication entity IMS supplies the electrical power supply to the actuator ACT, during a step E10. This power supply can originate from a DC or AC voltage generator or from a current generator. The electrical power supply is generated by the power supply and communication entity IMS between its electric terminals b1, b2, connected via the wires c1, c2, to the electric terminals of the actuator ACT, a1, a2.

Then, the power supply and communication entity IMS determines, during a step E140, a first time-sequence of a response signal I, respectively u, called first calibration sequence SeqCal.

A meaning of representation of a first predetermined binary element, bCal, is assigned, during a step E160, to the first calibration sequence SeqCal.

In one embodiment, the step E140 of determining the calibration sequence SeqCal comprises the following substeps:

E142 for determining the start of the sequence, when the response signal in current I, respectively in voltage u, on the wires c1, c2, reaches a first predetermined threshold value, Is1, respectively us1;

E144 for determining an extreme value, minimum or maximum, of the response signal in current $I_e$, respectively in voltage $u_e$, on the wires c1, c2; this determination uses known techniques, such as signal sampling, storage and processing;

E146 for determining the end of the sequence when the response signal in current I, respectively in voltage u, generated on the wires c1, c2 reaches a second threshold value Is2, respectively us2.

The step E140 may comprise an optional substep E148 of detection of a response signal in current I, respectively in voltage u, having a value substantially equal to the second threshold value Is2, respectively us2, for a predetermined duration.

The response signal in current I, respectively in voltage u, is thus sampled and stored between the start an the end of the sequence SeqCal.

The second binary element, complementary to the calibration binary element bCal, may be represented by a second calibration sequence SeqCal2.

This second calibration sequence SeqCal2 can be detected by the power supply and communication entity IMS during a step E150.

Alternatively, the second calibration sequence SeqCal2 can be deduced from the first calibration sequence SeqCal, for example by adding or removing a predetermined part of the image of the first calibration sequence SeqCal.

It should be noted that only the first calibration sequence SeqCal needs to be known, the second binary element being able to be made up of any sequence, not necessarily always the same, but is different from the first calibration sequence SeqCal.

Then, during a step E12, the power supply and communication, entity IMS receives a series of time-sequences of the response signal in current I, respectively in voltage u, representative of a series of binary elements, each binary element equal to the calibration binary element bCal being represented by a time-sequence that is an image of the first calibration sequence SeqCal. The power supply and communication entity deduces from this series of time-sequences a series of useful information items.

Figure 3:
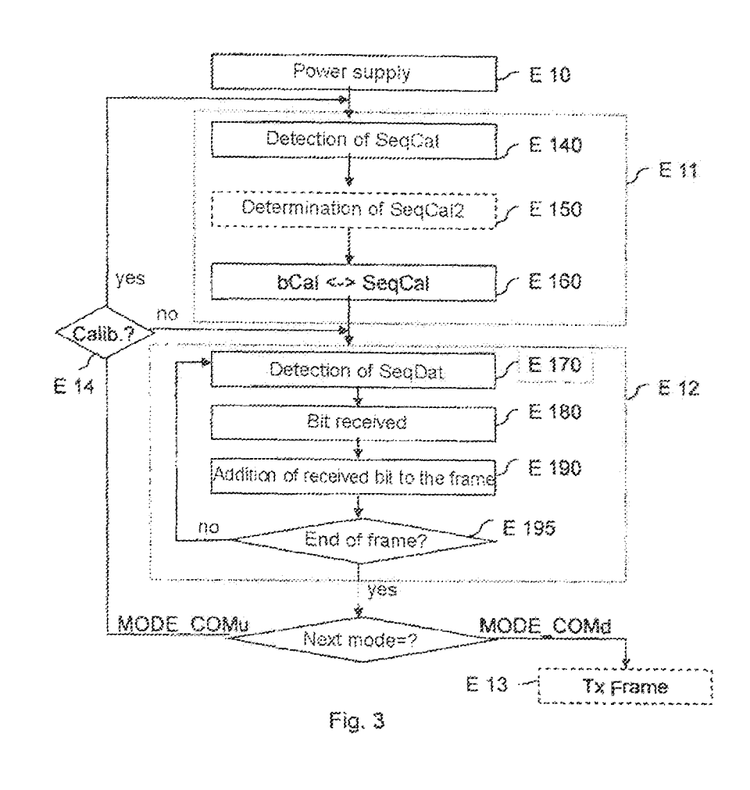
FIGS. 3, 3a and 3b represent, in flow diagram form, the main steps of a communication method according to the invention, implemented by a power supply and communication entity IMS.
Figure 3A:
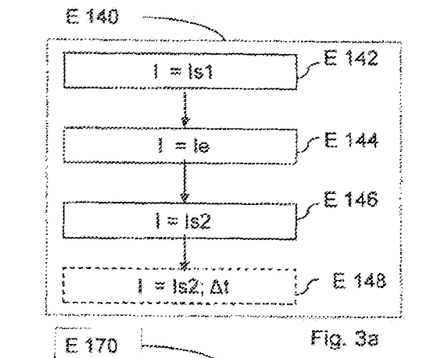
Figure 3B:
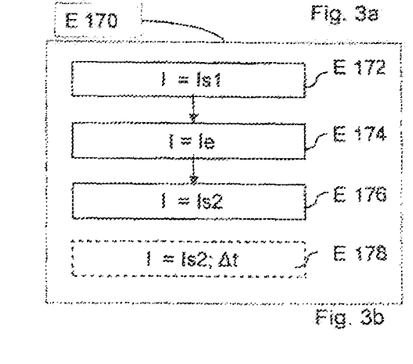

In the example illustrated by FIGS. 3, 3a and 3b, the reception step E12 comprises a substep E170 of detection of a time-sequence of the response signal in current I, respectively u, representative of a binary element bDat, called data sequence SeqDat.

In one embodiment, the step E170 of detection of the data sequence SeqDat comprises the following substeps:

detection E172 of a first value of the response signal in current I, respectively u, generated on the wires c1, c2, substantially equal to the first threshold value Is1, us1;

detection E174 of a second value of the response signal in current I, respectively u, generated on the wires c1, c2, substantially equal to the extreme value $I_e$, respectively $u_e$;

detection E176 of a third value of the response signal in current I, respectively in voltage u, generated on the wires c1, c2, substantially equal to the second threshold value Is2, us2.

The step E170 may comprise an optional substep E178 of detection of a response signal in current I, respectively in voltage u, having a value substantially equal to the second threshold value Is2, respectively us2, for a predetermined duration.

Once the sequence SeqDat is determined, the power supply and communication entity can determine, during a substep E180, the value of the binary element bDat by comparing the data sequence SeqDat with at least the first calibration sequence SeqCal: a data sequence, the image of the first calibration sequence SeqCal, is interpreted by the power supply and communication entity IMS as a data binary element equal to the calibration binary element bCal.

If the embodiment implements a step of determination, by detection or deduction, of the second calibration sequence SeqCal2, the data sequence SeqDat can be compared, during the substep E180, with the two calibration sequences, SeqCal, SeqCal2.

In one embodiment, the end of a data frame is determined during a step E195, by the detection of an end-of-frame-specific time-sequence of the response signal. Alternatively, the end of a frame can be determined by comparing the number of bytes received with the number of bytes expected.

The step E140 of detection of the first calibration sequence SeqCal, possibly followed by the optional step E150 of detection of the second calibration sequence SeqCal2, constitutes/constitute a calibration detection step E11.

The role of this step E11 is to enable the power supply and communication entity IMS to determine the information concerning the encoding of the data which will be transmitted subsequently. In this way, the encoding can change on each new connection and/or on each modification of transmission conditions.

A calibration detection step E11 is executed at least once, following the connection between the power supply and communication entity IMS and the actuator ACT, but it can be executed several times during one and the same connection, for example if a temperature variation is detected, or if the number of transmission errors is too high. This error detection can be performed using known techniques, such as CRCs, parity bits, or any other sequence intended to check the integrity of received data.

A change of operating conditions, detected by the power supply and communication entity IMS, can be signaled to the actuator ACT during a step E14 by the generation of a predetermined time variation of the power supply signal UReqCal1, respectively iReqCal1. This time variation of the power supply signal constitutes a calibration request sent by the power supply and communication entity IMS.

A change of operating conditions requiring a new calibration can be signaled also by the actuator ACT; in this case, a third time-sequence of the response signal in current, IReqCal2, respectively in voltage, uReqCal2, is generated by the actuator ACT.

The power supply and communication entity IMS can detect, during the step E14, this predetermined third time-sequence of the response signal IReqCal2, respectively of the voltage uReqCal2.

The power supply and communication entity IMS can therefore, during the step E14, detect or generate a calibration request and thus determine that the next step to be executed is a step E140 of determining the calibration sequence SeqCal.

In another embodiment of the method, the information elements are not necessarily binary. They consist more generally of information elements that can take a plurality of states or values and in particular more than two values or states.

As seen previously, the communication according to the invention can be carried out without adding dedicated components in the actuator. The generation of the response signal is produced by using the motor as load. However, this response signal is attenuated, notably by capacitors on the motor control electronic card.

The communication speed will depend greatly on the assembly formed by the motor control electronic card and the motor.

To improve the uplink communication speed, that is to say from the actuator to the power supply and communication entity, one possibility would be to add dedicated components which would make the communication protocol independent of the electronic card/motor assembly. Furthermore, since these components are electrically placed in the input stage, it would be necessary to protect them against the electromagnetic disturbances (lightning for example). This protection would lead to the addition of other components. The addition of all these additional components would result in an increase in the length of the actuator. For cost reasons, this possibility is not conceivable on mass-manufactured products.

Advantageously, the communication bit rate is adapted to the actuator automatically or adaptively. Depending on the context of the actuator (actuator torque, construction dispersion, temperature, etc.), the uplink communication, that is to say from the actuator to the power supply and communication entity may also be more or less rapid. To establish the uplink communication speed, if the communication parameters are set by construction, the following must be taken into account;
- the maximum dispersion on the actuator, the latter being dependent in particular on the motor, on the capacitors of the actuator; and
- the maximum drift, the latter being dependent in particular on the temperature for example.

It is then possible to determine a procedure that takes into account these maximum dispersion and drift factors, to define a protocol compatible with the conditions least favorable to the communication speed.

Following the generation of a pulse or of a time-sequence of the response signal, the actuator monitors certain internal signals (the voltage of the power supply signal for example), then the actuator determines the instant at which the transient regime ends. At that instant, the actuator can send a new pulse.

This logic works if the actuator sends information making it possible to "calibrate" the time between two pulses.

Each frame sent is, for example, made up of:
- a "calibration" element (for example a "0 bit" followed by a "1 bit"). It would be possible to send a single calibration bit and deduce therefrom the other or others by a mathematical relationship (for example, the duration of the 1 bit is 1.5 times the duration of the 0 bit. As another example, for calibration sequences coding two bits, it is possible to vary the duration of the second sequence, compared to the first, as in the preceding example, and obtain the third and fourth sequences by modifying the respective amplitudes of the first and second sequences). However, by sending all the calibration bits, the protocol may be rendered accessible to all future equipment types,
- one or more data elements.

Figure 7:
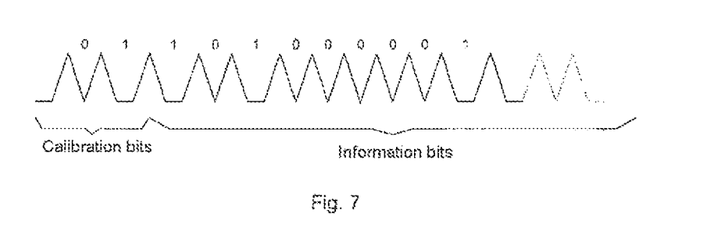
FIGS. 7 to 11 represent frames or portions of frames of response signals.

For example, the bit rate can be determined at the start of each frame. A frame can have a structure as represented in FIG. 7. By virtue of the two calibration bits, the power supply and communication entity listening to the actuator is calibrated and adjusted to the bit rate set by the actuator. This adjustment advantageously takes place on each new frame.

Advantageously, each data element or each calibration element may comprise a plurality of bits. For example, each element can code two bits as follows:
- the succession of the bits 0 and 0 can be translated or coded by a first state of the data element;
- the succession of the bits 0 and 1 can be translated or coded by a second state of the data element;
- the succession of the bits 1 and 0 can be translated or coded by a third state of the data element;
- the succession of the bits 1 and 1 can be translated or coded by a fourth state of the data element.

Figure 8:
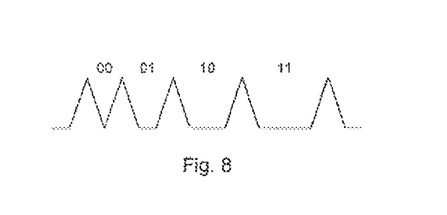

Such an information coding logic can be illustrated by the frame represented in FIG. 8.

Each data element represents several bits. In the example given above, a data element represents two bits. However, the principle can be extended with a data element representing n bits. There obviously follows an increase in transmission speed or in the data transfer rate. For example, to code and transmit an "A" in ASCII code, the binary string 0100 0001 must be used.

Figure 9:
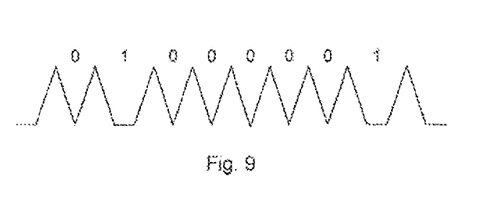

With a coding in which a data element or a pulse is used to code one bit, it is possible to obtain a frame as represented in FIG. 9. To observe the principle of self-adaptation of the listening power supply and communication entity, it is necessary to send, prior to the data, a succession of the two calibration pulses (this succession of the calibration pulses not being represented in this figure).

Figure 10:
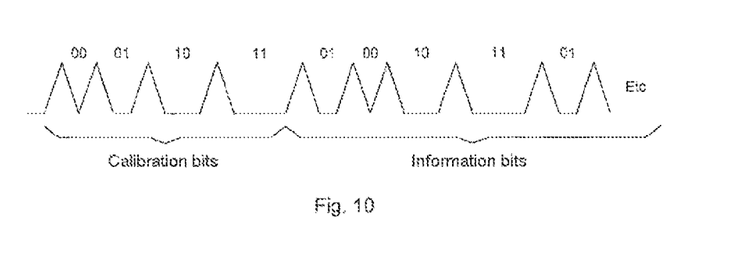

With a coding in which a data element or a pulse is used to code two bits, it is possible to obtain a frame as represented in FIG. 10. However, to observe the principle of self-adaptation of the listening power supply and communication entity, it is necessary to send, prior to the data, a succession of four calibration pulses.

The result of this is that, if the quantity of data to be sent is small and if the calibration elements have to be sent in each beginning of frame, it is favorable to code a single bit with one data element or one pulse. However, if the quantity of information to be sent is high (or if the calibration elements did not have to be sent systematically in each beginning of frame), it is favorable to code two bits with one data element or one pulse. Thus, this possibility of different coding schemes makes it possible to achieve a higher data transmission speed.

Advantageously, the power supply and communication entity can automatically determine the nature of the coding used by the actuator to communicate. In practice, as long as the power supply and communication entity detects elements or pulses not yet already received in the frame that it is in the process of receiving, it interprets these elements or pulses as calibration elements.

For example, with the communication, logics described previously, upon the detection of a third pulse of the frame, the power supply and communication entity detects:
  either a data element that is already known; the listening power supply and communication entity can deduce therefrom that the actuator codes a single bit with one data element or one pulse;
  or a data element that is not yet known; the listening power supply and communication entity can deduce therefrom that the actuator codes two bits or more with one data element or one pulse.
As stated above, the principle can be extended to n bits.

Also advantageously, in the examples cited, the order of sending of the different calibration elements makes it possible to determine the communication protocol used by the actuator to communicate with the power supply and communication entity. For example, in the case where a pulse is used to code a bit: it is possible to indicate the use of two different communication protocols:
  if the actuator uses the first protocol, it first sends a calibration pulse coding the 0 bit, then a calibration pulse coding the 1 bit;
  if the actuator uses the second protocol, it first sends a calibration pulse coding the 1 bit, then a calibration pulse coding the 0 bit.

For example, in the case where a pulse is used to code two bits and where there are four different calibration pulses: it is possible to indicate the use of 24 different communication protocols by considering the different possible orders of sending of the four calibration pulses.

Thus, the set of the time-sequences of the step or of the phase of calibration defines the protocol used and/or the information elements used in the signal or in the frame.

Figure 11:
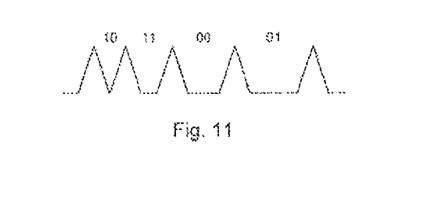

Preferably, when the calibration elements are defined, the frame to be sent is first analyzed and the bit or the series of bits most used in the frame is/are associated with the shortest calibration pulses. For example, if the frame is made up to 25 times the pattern "10", 15 times the pattern "11", 12 times the pattern "00" and 4 times the pattern "01", it is beneficial to choose the coding defined in FIG. 11. There is a consequential data transmission speed advantage.

Over time, the communication protocol may be made more complex. The power supply and communication entity listening for the actuator can indicate to the actuator that it does not "understand" the protocol, for example by modifying its power supply, notably by a switch from 120 V to 80 V or 0 V in the power supply voltage.

In practice, the actuator can send, according to one protocol, a pulse to code two bits whereas the power supply and communication entity knows only one protocol in which one pulse codes one bit. As soon as the listening power supply and communication entity sees a calibration sequence that it does not know, it notifies the actuator, notably by modifying the power supply voltage. Thus, the actuator can consequently switch to a communication mode defined by another protocol known to the power supply and communication entity, notably a slower communication protocol, for example using one pulse to code one bit.

Advantageously, the actuator must generate pulses with a signal/noise ratio that is as high as possible, and all in the shortest possible times. Nevertheless, the physical limitations of the actuator must be taken into account. In practice, an excessively high current can destroy or damage the actuator, notably damage the electronic switches or demagnetize the motor. For this, the pulse is started by setting a load on the actuator corresponding to a maximum intensity (Imax) of the current powering the actuator, then, when the limit intensity is almost reached, the load is modified so as to maintain the intensity at this limit value. In the case of an actuator with windings (for which the resistance has the value $R_{winding}$) connected in delta configuration, with two switches in the actuator, the load can have the value $\frac{2}{3} \times R_{winding}$. With three switches in the actuator, the load can have the value $\frac{1}{2} \times R_{winding}$. Furthermore, to maintain the intensity at this value, it is possible to drive series of openings and closures of the switches in PWM (pulse width modulation) mode.

The invention claimed is:

1. A communication method for a home automation actuator comprising an electric motor driving a moving element in a building and two electric terminals for powering the actuator by a power supply and communication entity and allowing the communication between the actuator and the power supply and communication entity via two wires, the method comprising the following steps:
  analysis of a power supply signal supplied by the power supply and communication entity;
  generation by the actuator of a first time-sequence of a response signal, representative of a first predetermined calibration information element, called first calibration sequence; and
  sending, from the actuator to the power supply and communication entity, a data frame that forms at least a part of the response signal, wherein the data frame corresponds to a series of time-sequences of the response signal, representative of a series of information elements that represent variations of the response signal circulating on the two wires, each information element of this series, equal to the calibration information element, being represented by a time-sequence which is an image of the first calibration sequence,
  wherein the data frame sent by the actuator to the power supply and communication entity establishes a communication protocol for communication between the actuator and the power supply and communication entity.

2. The method as claimed in claim 1, in which each information element codes a binary element or two binary elements or more than two binary elements.

3. The method as claimed in claim 2, in which a number of binary elements coded by each information element is determined according to the volume and/or the content of the information to be sent, notably according to the volume and/or the content of the information to be transmitted in the frame.

4. The method as claimed in claim 1, in which the method also comprises, prior to the sending step, at least one step of generation of a second time-sequence of the response signal, representative of a second calibration information element, called second calibration sequence.

5. The method as claimed in claim 1, in which the method comprises a step of deduction of at least one second time-sequence from the response signal, representative of a second calibration information element, by using the knowledge of the first calibration sequence and/or criteria shared by the actuator and the power supply and communication entity.

6. The method as claimed in claim 1, in which the sending comprises the generation, for each value of the information element, of a time-sequence of the response signal corresponding to, in particular equal to, the calibration sequence associated with this value of the information element.

7. The method as claimed in claim 1, in which the order of generation of the first time-sequence of the response signal and of generation of the at least one second time-sequence of the response signal is defined by the communication protocol chosen by the actuator, from a set of at least two protocols, notably the order of generation of the first time-sequence of the response signal and of generation of the at least one second time-sequence of the response signal indicates the coding mode of the information elements in the protocol chosen by the actuator.

8. The method as claimed in claim 1, in which the actuator is capable of implementing a plurality of communication protocols and in which the actuator chooses another communication protocol to be used in the case of reception of a non-compatibility information item sent by the power supply and communication entity.

9. The method as claimed in claim 1, in which the step of generation of the first calibration sequence comprises the following substeps:
configuration of the impedance of the actuator with a first value for a first duration; and
configuration of the impedance of the actuator with a second value for a second duration.

10. The method as claimed in claim 9, in which the step of generation of the first calibration sequence comprises a substep of configuration of the impedance of said actuator with a third value for a third duration.

11. The method as claimed in claim 9, in which at least one configuration substep comprises a driving of a controlled switch of the actuator, in particular a series of openings and closures of the switch in PWM (pulse width modulation) mode.

12. The method as claimed in claim 1, in which the method comprises a step of detection of a time variation of the power supply signal, representative of a calibration request sent by the power supply and communication entity.

13. The method as claimed in claim 1, in which the method comprises a step of generation of a third time-sequence of the response signal, representative of a calibration signaling sent by the actuator.

14. The method as claimed in claim 1, wherein if the power supply signal is provided in the form of a voltage signal, the response signal is in the form of an intensity of electric current signal; or if the power supply signal is provided in the form of an electric current signal, the response signal is in the form of an electric voltage signal.

15. The method as claimed in claim 1, wherein the response signal is in the form of a frame transmitted over the two wires, and wherein the two wires are configured to be dedicated for communication or used for power and communication by varying an input impedance.

16. The method as claimed in claim 1, wherein the calibration sequence represents information concerning encoding of data that will be transmitted subsequently between the actuator and the power supply and communication entity.

17. A communication method for a power supply and communication entity comprising two electric terminals making it possible to power a home automation actuator comprising an electric motor driving a moving element in a building, and to communicate with this actuator via two wires,
the method comprising the following steps:
generation of a power supply signal between the electric terminals;
determination of a first time-sequence of a response signal by the actuator, called first calibration sequence;
assignment of a meaning of representation of a first predetermined calibration information element to the first calibration sequence; and
reception, by the power supply and communication entity, of a data frame that forms at least a part of the response signal, wherein the data frame corresponds to a series of time-sequences of the response signal, representative of a series of information elements that represent variations of the response signal circulating on the two wires, each information element of this series, equal to the calibration information element, being represented by a time-sequence which is an image of the first calibration sequence,
wherein the data frame establishes a communication protocol for communication between the actuator and the power supply and communication entity.

18. The method as claimed in claim 17, in which the power supply and communication entity assigns, prior to the reception step, each time-sequence of the response signal not already received in the frame a meaning of representation of at least one second predetermined calibration information element.

19. The method as claimed in claim 17, in which the method comprises a step of deduction of at least one second time-sequence of the response signal, representative of a second calibration information element, by using the knowledge of the first calibration sequence and/or criteria shared by the actuator and the power supply and communication entity.

20. The method as claimed in claim 18, in which the power supply and communication entity deduces, from each time-sequence of the response signal of the frame which has notably been received and to which it has already been assigned a meaning of representation of a calibration information element, an information element value equal to the value of the calibration information element previously assigned to this time-sequence of the response signal.

21. The method as claimed in claim 19, in which the power supply and communication entity deduces, from each time-sequence of the response signal of the frame which has notably been received and to which it has already been assigned a meaning of representation of a calibration information element, an information element value equal to the value of the calibration information element previously assigned to this time-sequence of the response signal.

22. The method as claimed in claim 17, in which the power supply and communication entity is capable of sending a non-compatibility information item by modifying the power supply signal, notably by modifying the voltage of the power supply signal.

23. The method as claimed in claim 17, in which the step of determination of the first calibration sequence comprises the following substeps:
determination of a first threshold value of the response signal;

determination of an extreme value of the response signal; and determination of a second threshold value of the response signal.

24. The communication method as claimed in claim 17, in which the step of reception of the data frame that forms at least a part of the response signal, wherein the data frame corresponds to the series of time-sequences, comprises the following substeps:

detection of a time-sequence of the response signal, representative of an information element, called data sequence; and determination of the value of the information element by comparison of the data sequence with at least the first calibration sequence.

25. The communication method as claimed in claim 24, in which the step of detection of the data sequence comprises the following substeps:

detection of a first value of the response signal equal to the first threshold value;

detection of a second value of the response signal equal to the extreme value; and detection of a third value of the response signal equal to the second threshold value.

26. The method as claimed in claim 17, in which the method comprises a step of generation of a time variation of the power supply signal, representative of a calibration request sent by the power supply and communication entity.

27. The method as claimed in claim 17, in which the method comprises a step of detection of a third time-sequence of the response signal, representative of a calibration signaling sent by the actuator.

28. The method as claimed in claim 17, wherein if the power supply signal is provided in the form of a voltage signal, the response signal is in the form of an intensity of electric current signal; or if the power supply signal is provided in the form of an electric current signal, the response signal is in the form of an electric voltage signal.

29. The method as claimed in claim 17, wherein the response signal is in the form of a frame transmitted over the two wires, and wherein the two wires are configured to be dedicated for communication or used for power and communication by varying an input impedance.

30. A home automation actuator, comprising:

an electric motor driving a moving element in a building;

two electric terminals making it possible to power the actuator by a power supply and communication entity and allowing the communication between the actuator and the power supply and communication entity via two wires;

means:

for analyzing the power supply signal supplied by the power supply and communication entity;

for generating a first time-sequence of a response signal by the actuator, representative of a predetermined calibration information element, called first calibration sequence; and for sending, from the actuator to the power supply and communication entity, a data frame that forms at least a part of the response signal, wherein the data frame corresponds to a series of time-sequences of the response signal, representative of a series of information elements that represent variations of the response signal circulating on the two wires, each information element of this series, equal to the calibration information element, being represented by a time-sequence which is an image of the first calibration sequence, wherein the data frame sent by the actuator to the power supply and communication entity establishes a communication protocol for communication between the actuator and the power supply and communication entity.

31. The home automation actuator as claimed in claim 30, wherein if the power supply signal is provided in the form of a voltage signal, the response signal is in the form of an intensity of electric current signal; or if the power supply signal is provided in the form of an electric current signal, the response signal is in the form of an electric voltage signal.

32. The home automation actuator as claimed in claim 30, wherein the response signal is in the form of a frame transmitted over the two wires, and wherein the two wires are configured to be dedicated for communication or used for power and communication by varying an input impedance.

33. A power supply and communication entity, comprising:

two electric terminals making it possible to power a home automation actuator comprising an electric motor driving a moving element in a building and to communicate with this actuator via two wires;

means:

for generating a power supply signal between the electric terminals;

for determining a first time-sequence of a response signal generated by the actuator, called first calibration sequence;

for assigning a meaning of representation of a first predetermined calibration information element to the first calibration sequence; and for receiving, by the power supply and communication entity, a data frame that forms at least a part of the response signal, wherein the data frame corresponds to a series of time-sequences of the response signal, representative of a series of information elements that represent variations of the response signal circulating on the two wires, each information element of this series, equal to the calibration information element, being represented by a time-sequence which is an image of the first calibration sequence, wherein the data frame establishes a communication protocol for communication between the actuator and the power supply and communication entity.

34. The power supply and communication entity as claimed in claim 33, wherein if the power supply signal is provided in the form of a voltage signal, the response signal is in the form of an intensity of electric current signal; or if the power supply signal is provided in the form of an electric current signal, the response signal is in the form of an electric voltage signal.

35. The power supply and communication entity as claimed in claim 33, wherein the response signal is in the form of a frame transmitted over the two wires, and wherein the two wires are configured to be dedicated for communication or used for power and communication by varying an input impedance.

* * * * *